Feb. 11, 1958 C. COLLARO ET AL 2,823,039

AUTOMATIC OR MAGAZINE PHONOGRAPH APPARATUS

Filed April 6, 1955 8 Sheets-Sheet 1

Inventors
Christopher Collaro
Edward Thomas Humby
By
Bailey, Stephens and Huettig
Attorneys

AUTOMATIC OR MAGAZINE PHONOGRAPH APPARATUS

Filed April 6, 1955 8 Sheets-Sheet 2

Inventors
Christopher Collaro
Edward Thomas Humby
By
Bailey, Stephens and Huettig
Attorneys Feb. 11, 1958 C. COLLARO ET AL 2,823,039

AUTOMATIC OR MAGAZINE PHONOGRAPH APPARATUS

Filed April 6, 1955 8 Sheets-Sheet 3

Inventors
Christopher Collaro
Edward Thomas Henly
By
Bailey, Stephens and Huettig
Attorneys

AUTOMATIC OR MAGAZINE PHONOGRAPH APPARATUS

Inventors
Christopher Collaro
Edward Thomas Humby
By
Bailey, Stephens and Huettig
Attorneys Inventors
Christopher Collaro
Edward Thomas Humby
By
Bailey, Stephens and Huettig
Attorneys Feb. 11, 1958 C. COLLARO ET AL 2,823,039

AUTOMATIC OR MAGAZINE PHONOGRAPH APPARATUS

Filed April 6, 1955 8 Sheets-Sheet 6

Inventors
Christopher Collaro
Edward Thomas Humby
By
Bailey, Stephens and Huettig
Attorneys

AUTOMATIC OR MAGAZINE PHONOGRAPH APPARATUS

Inventors
Christopher Collaro
Edward Thomas Humby
By
Baley, Stephens and Huettig
Attorneys Feb. 11, 1958 C. COLLARO ET AL 2,823,039

AUTOMATIC OR MAGAZINE PHONOGRAPH APPARATUS

Filed April 6, 1955 8 Sheets-Sheet 8

Inventors
CHRISTOPHER COLLARO
EDWARD Thomas Humby
By
Bailey Stephens & Huettig
Attorneys United States Patent Office 2,823,039

Patented Feb. 11, 1958

2,823,039

AUTOMATIC OR MAGAZINE PHONOGRAPH APPARATUS

Christopher Collaro and Edward Thomas Humby, Barking, England, assignors to Collaro Limited, Barking, England, a British company Application April 6, 1955, Serial No. 499,740

Claims priority, application Great Britain April 6, 1954

4 Claims. (Cl. 274—10)

This invention relates to automatic or magazine phonograph apparatus of the kind in which a stack of records to be played are supported above the turntable and are allowed to fall singly on to the turntable for playing.

In such apparatus, a cycle of operations, after playing of a record is completed, comprises lifting the pick-up off the record, swinging the pick-up outwardly until it is clear of the turntable and records, releasing the lowermost record of the stack to fall on to the turntable, moving the pick-up inwardly over the periphery of the record just placed on the turntable, and finally lowering the pick-up on to the record. Stop mechanism must be provided for limiting the inward movement of the pick-up so that the pick-up will be accurately positioned to enable the stylus to engage with the outermost part of the record groove. If records of two or more different sizes are to be played, then the said stop mechanism must be adjustable accordingly.

Adjusting means for the stop mechanism for locating the pick-up over the periphery of a record can be made responsive to the size of a record fed on to the turntable, so that the stack of records may comprise records of two or more different sizes, and as each record is fed on to the turntable the pick-up locating means or stop will be either left in a pre-determined position or will be adjusted according to the size of the record. Adjusting means for this purpose usually comprises what we will term a "gate mechanism" having one or more displaceable members or pivoted arms projecting into the path of records above a given size between the stack and the turntable. It is important that the gate mechanism should not cause the records to be rocked as they pass to the turntable, because such rocking as a record is falling on to the turntable may cause damage to that record or to a record which is at that time resting on the turntable. To avoid rocking the records it has previously been proposed to have two pivoted arms projecting into the path of the records at diametrically opposite sides. Such an arrangement is somewhat complicated because the two pivoted arms must be interconnected so that they will be rocked about their pivots in unison. A single pivoted arm or other displaceable member has been used, but this is liable to rock a record when the record engages with the displaceable member.

This difficulty has been increased recently because many records are now made extremely light in weight, and consequently they are frequently rocked by the "gate mechanism," and in some cases the weight of the record is insufficient to actuate the said mechanism.

The present invention is designed to provide a new or improved gate mechanism which, although having a single record engaging member, will eliminate or minimise any tendency to rock records being fed on to the turntable.

According to the invention, the gate mechanism comprises a pivotally mounted arm or lever which projects into the path of a record being fed on to the turntable, the said arm or lever being connected to means for locating the pick-up over the periphery of a record for adjusting the said locating means, mechanism being provided whereby after an initial small displacement due to engagement by a record, the arm or lever will be caused to swing away from the said record. The arm or lever may, therefore, be regarded as a trigger which, when cocked, projects into the path of a record as it falls from the stack on to the turntable, and when given an initial small displacement by engagement with a record being fed on to the turntable, the said arm or lever will continue its movement independently of the record. Consequently, as the record only has to initiate the movement of the arm or lever, and does not have to effect the entire movement, any tendency to cause the record to rock will be substantially eliminated or at any rate will be minimised.

Considering phonograph apparatus designed for playing two sizes of records, for example records of 10 inches and 12 inches in diameter respectively, the arm or lever need only project sufficiently for its tip or free end to be engaged by 12 inch diameter records. Consequently, the pick-up locating means will have two settings, one for a 10 inch record and the other for a 12 inch record, and it will ordinarily be set to the 10 inch record setting before a record is fed on to the turntable and will remain in that setting unless the next record released from the stack is a 12 inch record which will engage with and initiate displacement of the arm or lever to adjust the setting to that required for a 12 inch record.

In order that the invention may be clearly understood and readily carried into effect, a phonograph apparatus constructed according to the invention will now be more fully described, by way of example only, with reference to the accompanying drawings in which.

Figure 4:
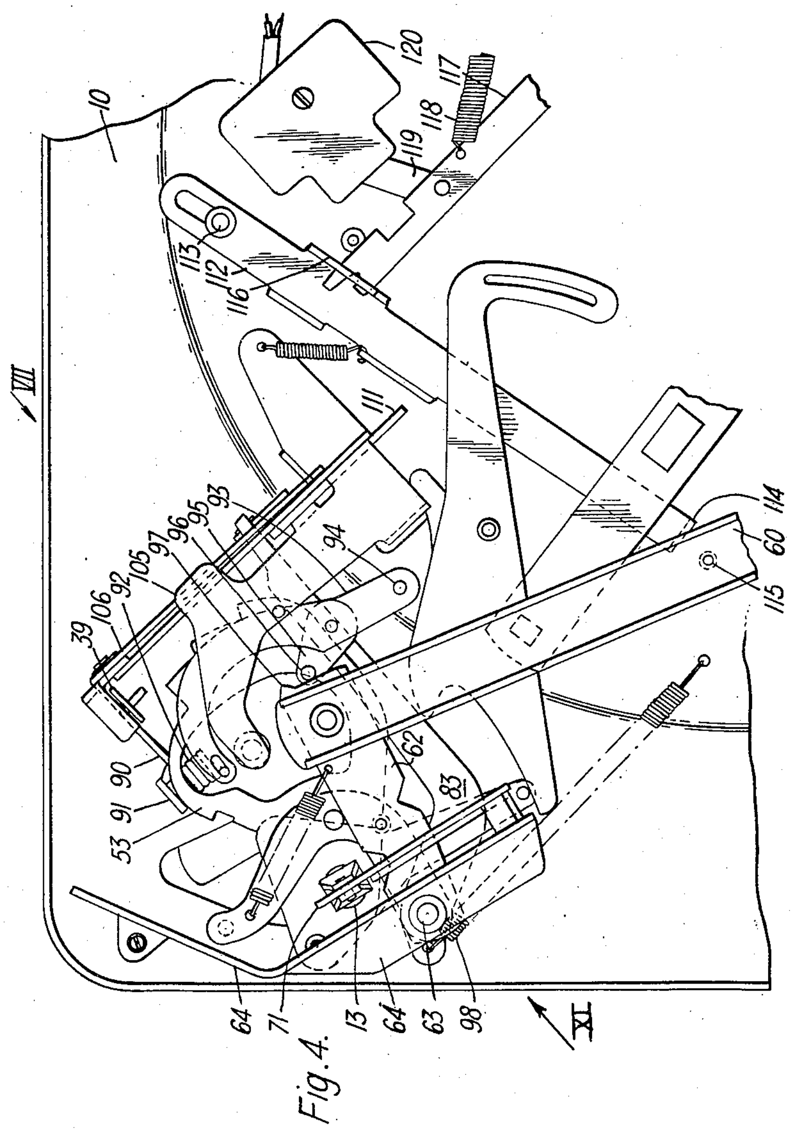
Figure 5:
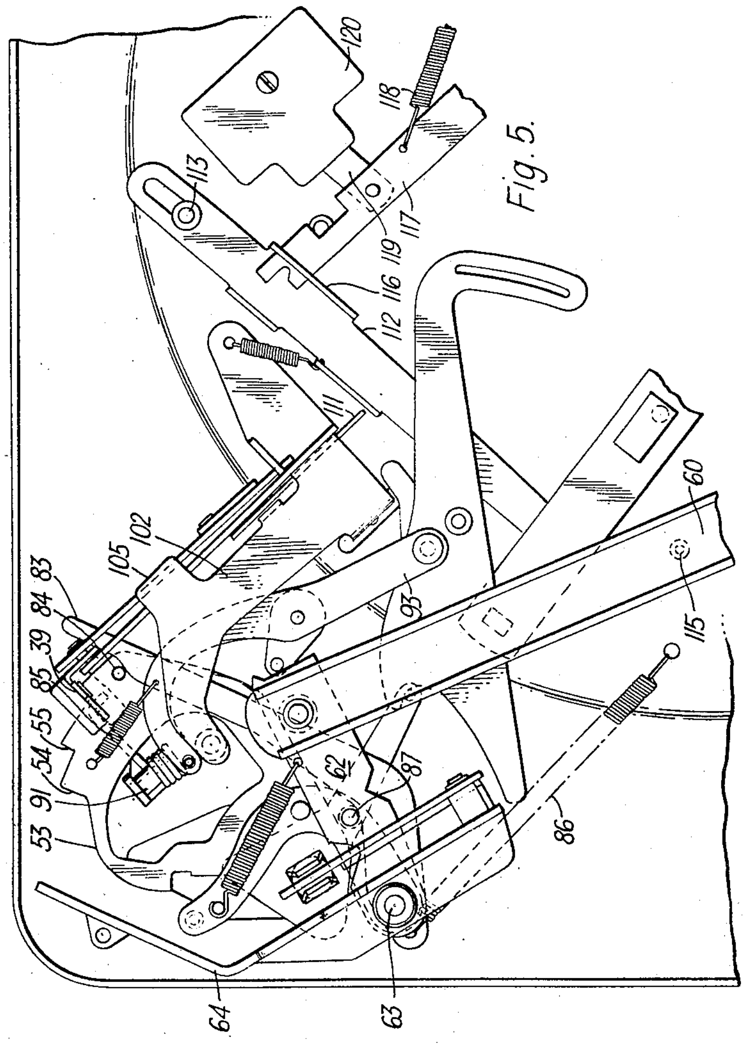
Figure 6:
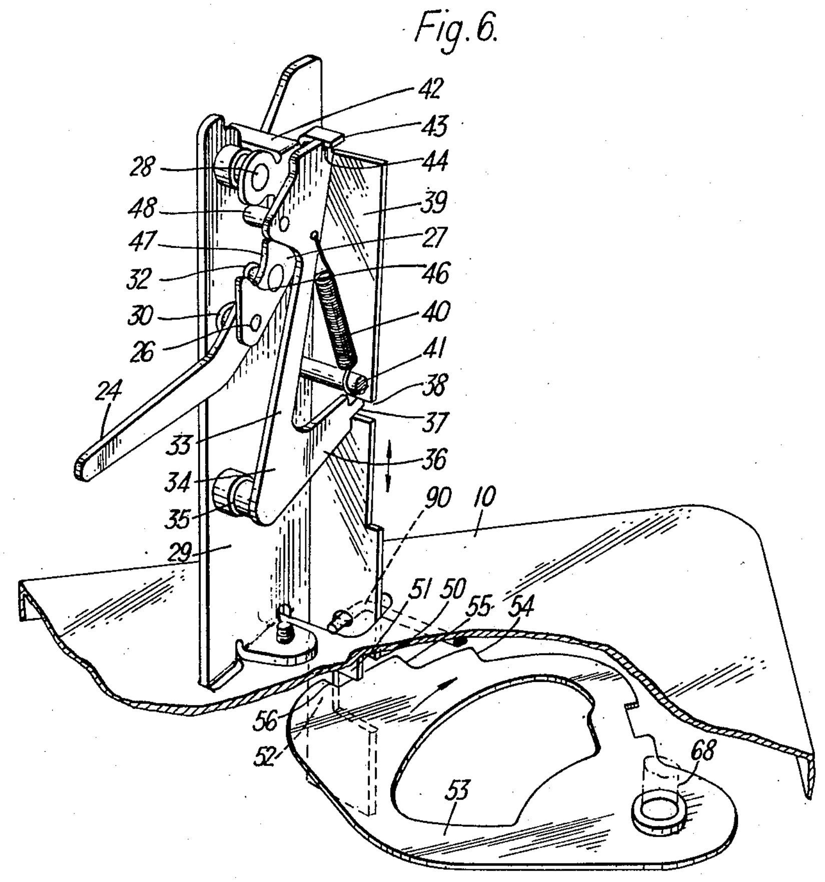
Figures 7, 8:
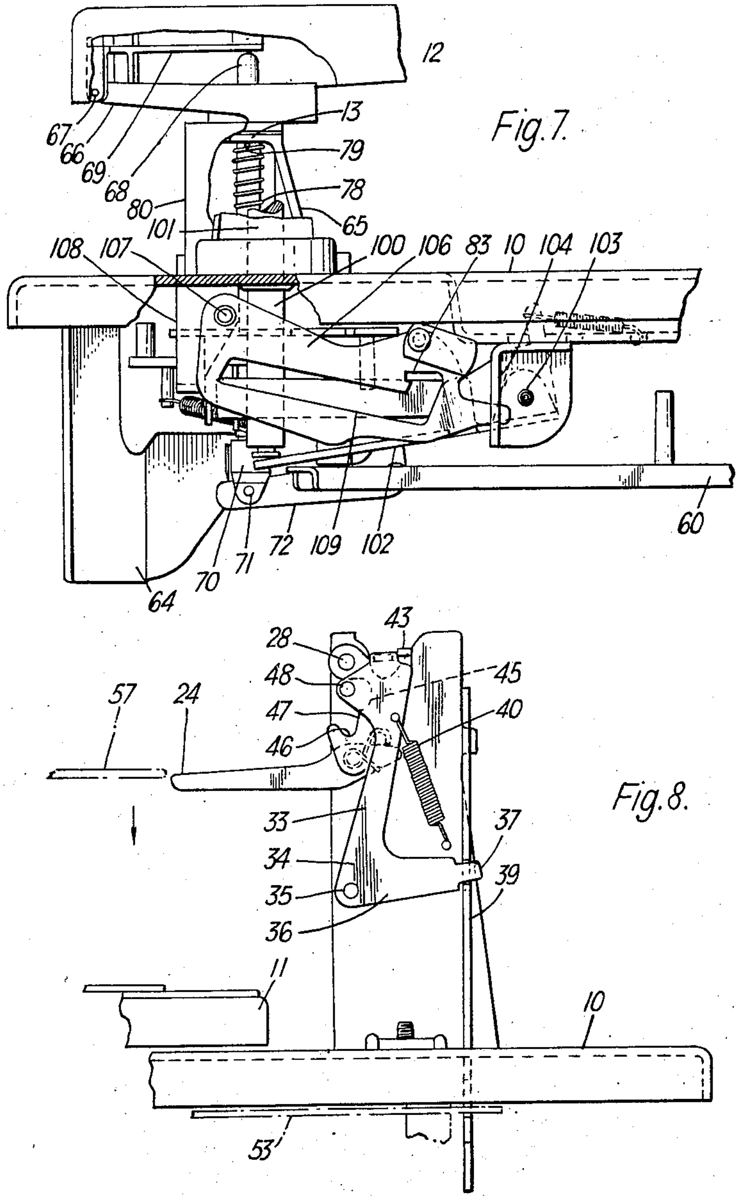
Figure 9:
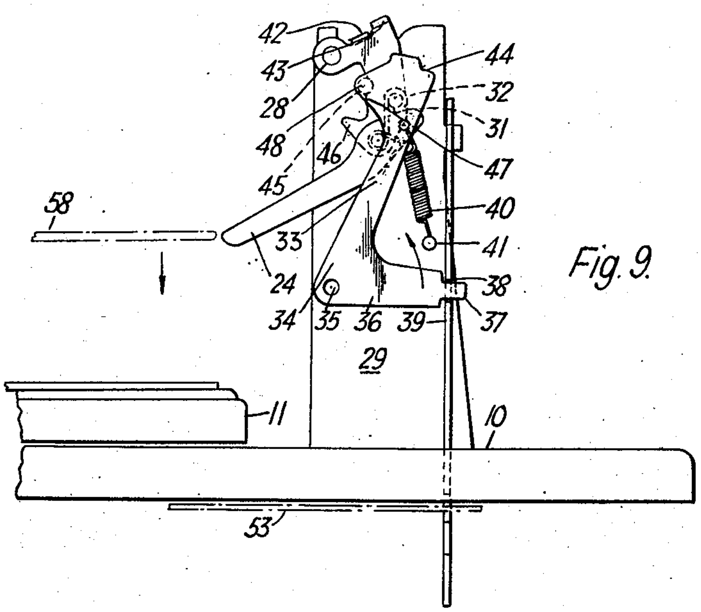
Figure 10:
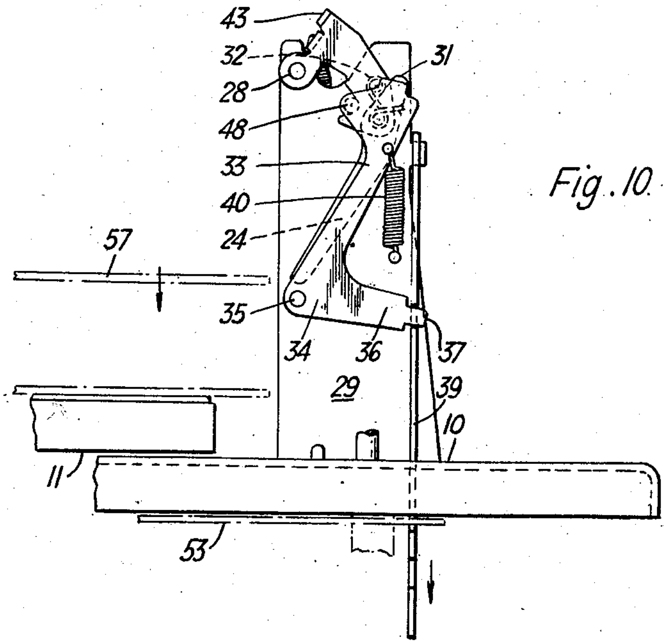
Figure 11:
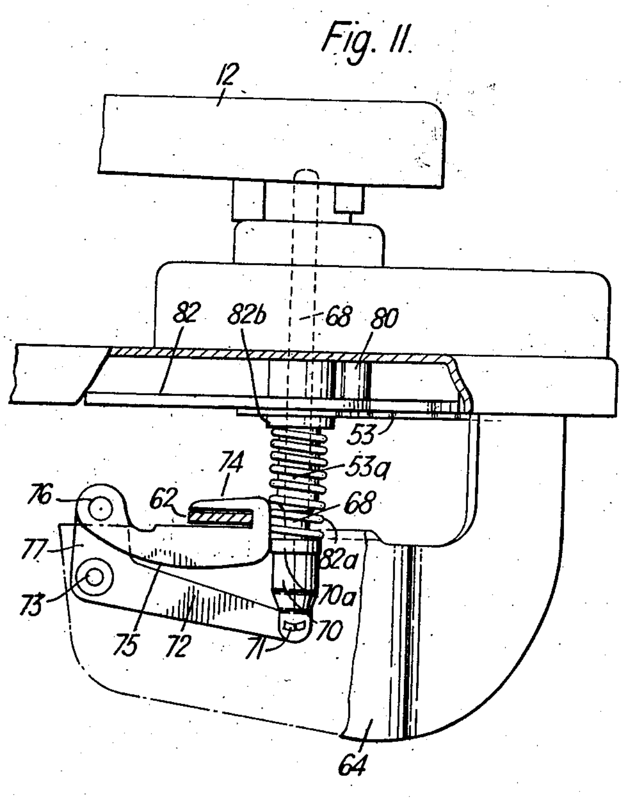

Figure 4 is an underneath view of part of the mechanism showing the parts in one position, Figure 5 is a view similar to Figure 4, but showing the parts in another position, Figure 6 is a detail perspective view of part of the mechanism, Figure 7 is a detail elevation, partly in section, looking in the direction of the arrow VII of Figure 4, and Figures 8, 9 and 10 are detail views illustrating the actuation of the mechanism by records of different sizes, Figure 11 is a detail elevation with part of the mechanism cut away to show the parts behind, looking in the direction of the arrow XI in Figure 4.

The particular construction illustrated in the drawings is designed for use with records of three different sizes, that is 7 inch, 10 inch and 12 inch records, which are the sizes in use at the present time.

Figure 2:
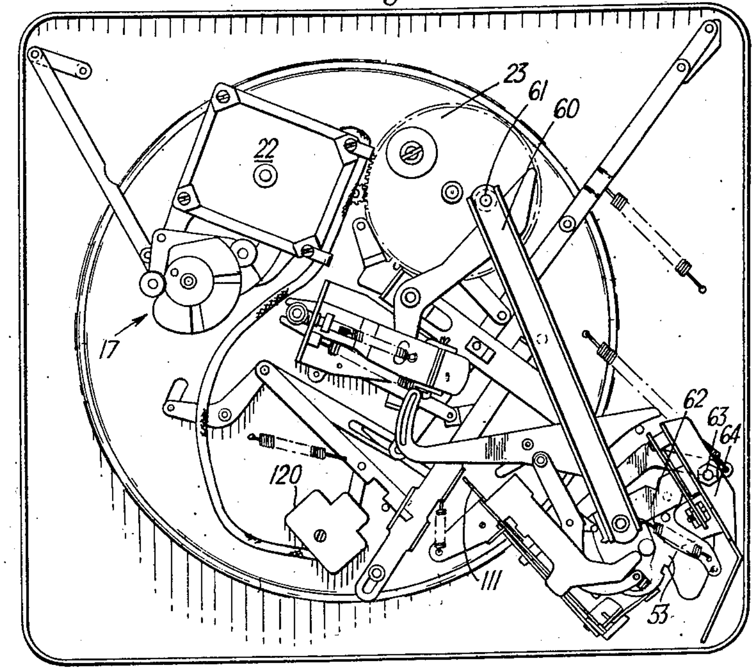
Figure 2 is an underneath view.

Referring to the drawings, 10 is the motor board, 11 is the turntable, 12 is the pick-up arm mounted on a vertical pivot 13, and 14 is the pick-up carried in the outer end of the arm 12. A control knob 15 is rotatably mounted on the motor board and is connected to mechanism which forms no part of the present invention for controlling the operation of the apparatus. A second or speed control knob 16 is similarly rotatably mounted on the motor board, and is connected to change speed mechanism indicated generally at 17 in Figure 2 beneath the motor board. The change speed mechanism likewise forms no part of the present invention, and is provided to enable the speed of rotation of the turntable to be adjusted according to the particular type of records to be played.

A magazine spindle 18 extends upwardly through the centre of the turntable, this spindle being of a known kind having an offset upper position 19 and a step 20 on which a stack of records can be supported, mechanism being provided for laterally displacing the lowermost record of the stack off the step 20 to enable it to fall down the main part of the spindle 18 on to the turntable 11 for playing. A record steadying member, in the form of a horizontal arm 21 mounted for swinging movements about a vertical axis, and for raising and lowering movements, is provided to rest on the uppermost record of a stack supported on the step 20 so as to maintain the said stack substantially horizontal. All of the parts and mechanism so far described are of known kinds and may be varied as desired according to requirements.

The apparatus is driven by an electric motor 22 which drives the turntable through the change speed mechanism 17, and is also operatively connected to a large gear wheel 23 at the commencement of a cycle of operations for the record changing mechanism. The means for connecting and disconnecting the gear wheel 23 and the motor 22 do not require detailed description, as such mechanisms are common to automatic or record changing gramophone apparatus. It is sufficient to say that the gear wheel 23 makes one complete revolution for each such cycle of operations as to cause the pick-up to be lifted from engagement with a record on the turntable, and be swung outwardly clear of the turntable and records, whereupon the next record is released from the step 20 to fall on to the turntable and the pick-up is swung inwardly and lowered into engagement with the outer portion of the playing groove of the said record.

The present invention is primarily concerned with the gate mechanism and the associated mechanism for causing engagement of the pick-up with the start of the record groove according to the size of the record.

Figure 1:
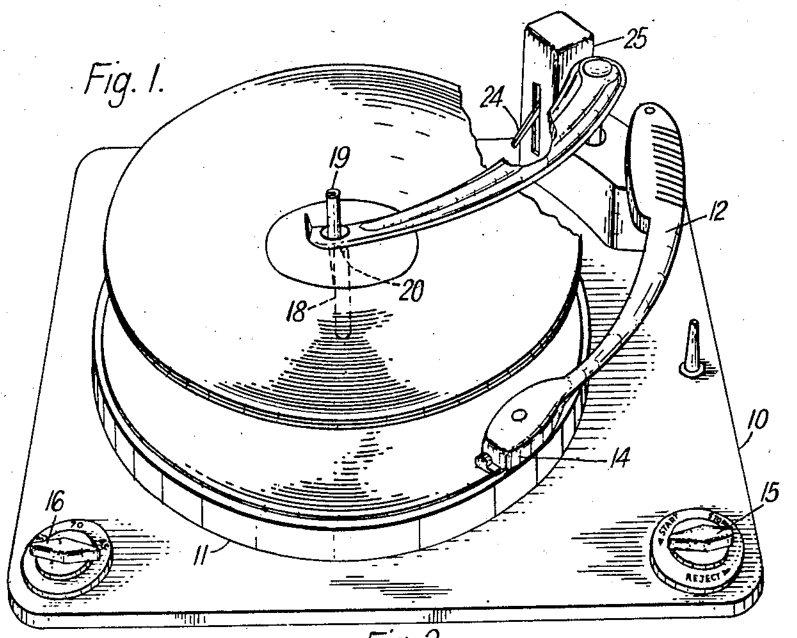
Figure 1 is a perspective view of the apparatus as seen from above.

The gate mechanism and associated parts comprise an arm or trigger 24 and mechanism partly disposed within a housing 25 and partly beneath the motor board 10. In all the views except Figure 1, the housing 25 has been removed to show the mechanism. Details of the gate mechanism are more clearly seen in Figures 6, 8, 9 and 10. The arm or trigger 24 is pivoted at 26 on a trigger plate 27 which is pivotally mounted at 28 on a supporting part 29 rigidly mounted on and upstanding from the motor board 10. The trigger 24 is engaged by a spring 30 which urges the trigger about its pivot 26 in a direction to cause a finger 31 on the trigger to engage with a pin 32 on the trigger plate 27. The trigger plate 27 is adapted to co-operate with one arm 33 of a bell-crank lever 34 pivoted at 35 on the supporting post 29. The other arm 36 of the bell-crank lever 34 has a spigot 37 adapted to engage in a notch 38 in a stop member 39 which is vertically slidable relatively to the supporting post 29. Rocking movements of the bell-crank lever 34 about the pivot 35 will therefore cause corresponding sliding movements of the stop member 39. A tension spring 40 has one end connected to the arm 33 of the bell-crank lever 34 and its other end anchored to a peg 41 on the supporting post 29, so as to resiliently urge the bell-crank lever 34 in a clockwise direction about its pivot 35.

The trigger plate 27 has a laterally projecting finger 42 adapted to engage with the upper end of the supporting post 29 to limit the movement of the trigger plate in a clockwise direction as seen in Figure 6, and it also has a second laterally projecting finger 43 adapted to engage with a notch 44 in the end of the arm 33 of the bell-crank lever 34, and when so engaged, as shown in Figures 6 and 8, the bell-crank lever is retained so as to hold the stopmember 39 in its raised position against the action of the spring 40. The trigger plate 27 also has a cam surface on one edge, this cam surface having two depressions 45 and 46 separated by a rise or hump 47, and the arm 33 of the lever 34 has a pin 48 adapted to co-operate with the ride over the cam surface when the trigger plate 27 is rocked about its pivot 28. When the finger 43 is disengaged from the notch 44, the pin 48 can be engaged with either of the notches 45 and 46. When the pin 48 is engaged with the notch 45, the bell-crank lever 34 will hold the stop member 39 in an intermediate position, and when the pin 48 is engaged with the notch 46, the bell-crank lever will hold the stop member 39 in its lowermost position.

The lower end portion of the stop member 39 has a stepped cut out portion so as to provide three abutment surfaces 50, 51 and 52 which are offset or staggered relatively to one another in vertical and lateral directions, and these three abutment surfaces are adapted to cooperate with a quadrant member 53 which is movable with the pick-up arm when the latter is swung about its vertical axis during the record changing cycle of operations. The quadrant member 53 has three steps 54, 55 and 56 adapted to engage with the abutment surfaces 50, 51 and 52 respectively according to the vertical position of the stop member 39 when the quadrant member is rotated in the direction indicated by the arrow in Figure 6, so as to locate the pick-up arm in positions corresponding with records of three different sizes.

The operation of the mechanism so far described is as follows:

Assuming that the pick-up arm has been swung outwardly clear of the turntable, the quadrant member will also have been turned in the direction opposite to that indicated by the arrow in Figure 6 so as to be clear of the stop member 39. When the parts are in this position, the record release mechanism will be operated to release the lowermost record from the stop 20 of the spindle 18 to allow the said record to descend on to the turntable. The record release mechanism is not illustrated, but such mechanisms are well known, and do not require to be described, as any such mechanism may be used and does not form any part of the present invention.

At this time, the stop member 39 will be in its raised position and the arm or trigger 24 will be in the position shown in Figures 6 and 8, that is it will be in a substantially horizontal position with its free end pointing towards the centre of the turntable. If a small diameter record, e. g. 7 inches in diameter, be fed on to the turntable, the record will not engage with the trigger 24, because the length of the latter is such as to avoid contact with the smallest size record for which the mechanism is designed see Figure 8. Consequently, the pick-up arm locating mechanism will not be actuated, and the stop member 39 will remain in its raised position. After the record has descended on to the turntable, the pick up arm will be swung inwardly, and the quadrant member 53 will be moved with the pick-up arm in the direction indicated by the arrow in Figure 6 until the stop 56 engages with the abutment surface 52 as shown in Figure 6 so as to stop the quadrant member and the pick-up arm with the pick-up in position over the edge portion of the record ready to be lowered to play the record.

In the event of a medium sized record, e. g. a 10 inch diameter record, being fed on to the turntable, the record 58 will engage with and depress the trigger 24 as shown in Figure 9 and due to the finger 31 of the trigger engaging with the pin 32 on the trigger plate 27, the trigger plate will be rocked about its pivot 28 to disengage the finger 43 from the notch 44. The bell-crank lever 34 will thus be released and will be turned by the spring 40 about the pivot 35 during which movement the pin 48 will ride along the cam surface of the trigger plate into the depression 45. As the pin 48 moves along the said cam surface, it will move the trigger plate and consequently the trigger in the same direction as the movement originally imparted to the trigger by the record 53, so that the record 53 only needs to give the trigger a small movement sufficient to disengage the finger 43 from the notch 44 whereupon the trigger will advance away from the record until the pin 48 engages in the depression 45, and the trigger 24 will be in the position shown in Figure 9 clear of the edge of the medium sized record 58. At the same time, the stop member 39 will be moved downwardly from the position shown in Figures 6 and 8 to its intermediate position as shown in Figure 7, so that when the pick-up arm is swung inwardly towards the centre of the turntable, the step 55 on the quadrant member 53 will engage with the abutment surface 51 so as to stop the quadrant member and the pick-up arm with the pick-up located over the peripheral portion of the medium sized record 58 which would have descended on to the turntable.

When a large record, e. g. a 12 inch diameter record, is being fed on to the turntable, the record will engage with and initiate movement of the trigger in the same manner as the medium sized record, but during its further descending movement, the record will depress the trigger beyond the position shown in Figure 9, thus rocking the trigger plate sufficiently to permit the pin 48 on the arm 33 of the bell-crank lever to ride over the rise or hump 47 whereupon under the influence of the spring 40, the pin 48 will cause the trigger plate to continue its movement (anti-clockwise as seen in Figures 6 and 10) until the pin 48 engages in the depression 46. The parts are shown in this position in Figure 10, where the trigger 24 is shown to have been moved clear of the edge of a large record 57 which initiated the movement of the trigger. During this movement, the bell-crank lever 33 will have moved the stop member 39 to its lowermost position so that the abutment surface 50 will be in position to engage with the step 54 of the quadrant member 53 to stop the pick-up arm during its inward movement with the pick-up located over the peripheral portion of the record 57 which would have descended on to the turntable.

The shape of the cam surface of the trigger plate and of the finger 43 and notch 44 and also the strength of the spring and the relative positions of these co-operating parts can be so arranged that only a very light pressure is required to initiate the first and second stages of movement of the trigger, so that this can be accomplished by modern lightweight records without causing any substantial rocking of the records as they are descending from the spindle step 20 on to the turntable 11.

The mechanism for giving the required movements to the pick-up arm during the record changing cycle of operations may be of any convenient construction, but a preferred mechanism for this purpose is illustrated in the drawings, and will now be described by way of example.

The record changing cycle is initiated at the end of playing a record, by the usual "velocity trip" device, which is so well known as to need no explanation. Suffice it is to say that when the velocity trip mechanism is actuated at the end of playing a record, the large gear wheel 23 is caused to make one complete revolution by the motor 22.

The movements for the pick-up arm are derived from the wheel 23 by means of a connecting bar 60, having one end journalled on an eccentric pin 61 on the wheel 23, and its other end pivoted on a lever 62 which is mounted on a pivot pin 63 extending between the motor board 10 and a bracket 64 mounted on the underside of the motor board, so that during one complete revolution of the wheel 23, the connecting bar 60 will be reciprocated once back and forth and the lever 62 will be rocked once back and forth with the connecting bar.

Figure 3:
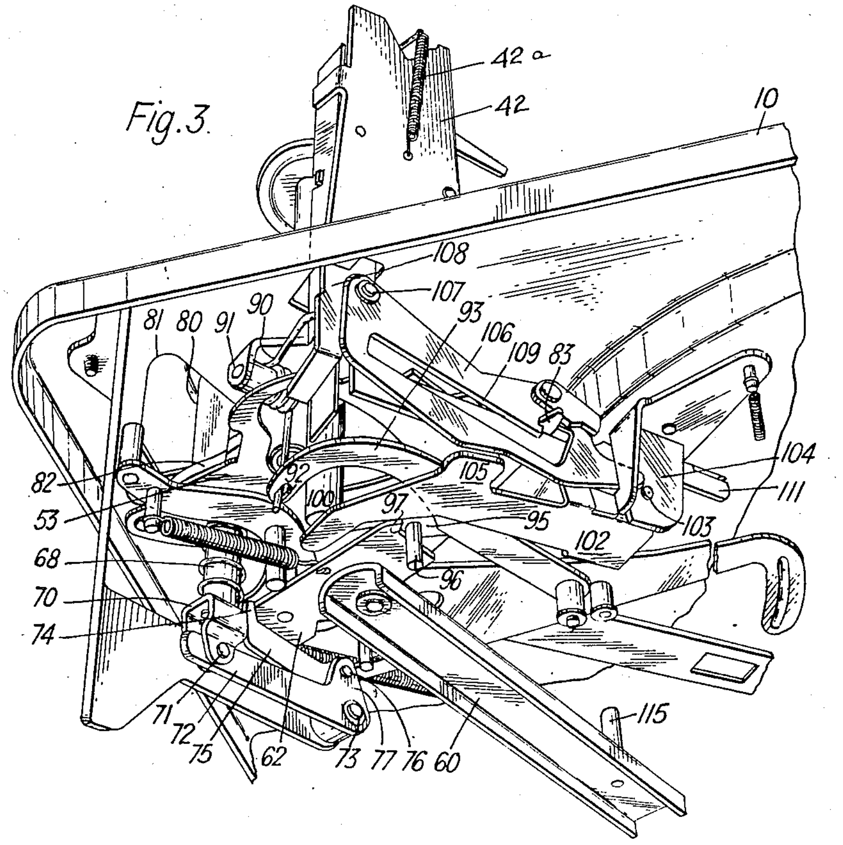
Figure 3 is a perspective view of part of the mechanism as seen from below.

The vertical pivot 13 is provided by a bracket 65 secured on the motor board 10, the bracket 65 being normally enclosed by the housing 25, but is shown in Figure 7 with the housing removed. An arm 66 is mounted about the said vertical pivot 13, and the pick-up arm 12 is mounted on a substantially horizontal pivot 67 at the end of the arm 66, the raising and lowering movements of the pick-up arm being about the pivot 67 and the horizontal swinging movements being about the vertical pivot 13 of the bracket 65. The raising and lowering movements of the pick-up arm are effected by a spindle 68 which is concentric with the pivot 13 and is axially slidable in the bracket 65, the upper end of the spindle 68 being adapted to engage with a plate 69 on the pick-up arm, the spindle extending downwardly through the motor board 10, its lower end having a connecting member 70 thereon which is pivoted at 71 to a lever 72, see Figures 3 and 7. The lever 72 is pivoted at 73 on the bracket 64. It will be seen that when the lever 72 is rocked, the spindle 68 will be moved axially to cause raising or lowering of the pick-up arm. The lever 62 which is pivotally connected to the bar 60 is adapted to engage with the hooked end 74 of a link 75 which is pivotally connected at 76, to an arm 77 on the lever 72 so that when the bar 60 is moved towards the left as seen in Figure 3, the lever 72 will be rocked in a counterclockwise direction through the lever 62, link 75 and arm 77 so as to move the spindle 68 downwardly against the action of a compression spring 78 encircling the spindle 68 and engaging between the bottom of the bracket 65 and a projection 79 on the spindle 68, thus lowering the pick-up arm about the pivot 67. When the bar 60 is moved in the opposite direction, the spindle 68 will be permitted to move upwardly under the influence of the spring 78 so as to raise the pick-up arm.

The arm 66 is secured to a connecting member 80 which moves with the arm 66 and extends through an opening 81 in the motor board and has the driven member 82 of a friction clutch secured on its lower end, see Figure 3 and Figure 11. The quadrant member 53 forms the driving member of the friction clutch, and to the member 53 a sleeve 53*a* is fixed and projects downwardly surrounding the spindle 68. When the spindle 68 is raised as described above, the upper part 70*a* of the connecting member 70 engages the bottom of the sleeve 53*a* and presses the quadrant 53 upwards so that its upper face engages with the underface of the driven member 82, so that when the quadrant 53 is moved, the member 82 and with it the pick-up arm 12 is also moved by the frictional force acting between the members 53 and 82. A spring 82*a* surrounds the sleeve 53*a* and abuts against a collar 82*b* on the sleeve 53*a* at its upper end and against the connecting member 70 at its lower end, but this spring is very light and only exerts sufficient force to prevent the quadrant member 53 falling downwardly. This force is not sufficient to cause frictional engagement between the quadrant member 53 and the driven member 82.

A lever 83 is mounted in the pivot 63 and it is adapted to engage with a pin 84 on the quadrant member 53, a tension spring 85 being connected between the quadrant member 53 and the lever 83 to normally maintain the lever in engagement with the pin 84. The lever 83 is urged by a spring 86 in a counterclockwise direction about the pivot 63, as seen in Figure 5, and into engagement with a pin 87 on the lever 62, so that as the latter is rocked by the bar 60, the lever 62 will be moved by the pin 87 positively in a clockwise direction, and will be moved by the spring 86 in a counterclockwise direction under the control of the lever 62 through the pin 87. During counterclockwise movement of the lever 62, the lever 83 will be moved in the same direction by the spring 85, and the quadrant 53 will be caused to move with the lever 83 due to engagement of the latter with the pin 84. When one or other of the steps 54, 56, 56 of the quadrant member 53 engages with the corresponding abutment surface 50, 51, 52 on the stop member 39, the quadrant member and the lever 83 will be prevented from further movement in the counterclockwise direction, which corresponds with inward swinging movement of the pick-up arm, but the lever 62 will be permitted to complete its full movement in the same direction as the pin 87 will move away from the lever 83 and the spring 85 will be extended, thus maintaining the step of the quadrant member in engagement with the abutment surface of the stop member. During the said continued movement of the lever 62 after the quadrant member has been stopped, the lever 62 will engage with the hook 74 of the link 75 to displace the latter and cause the spindle 68 to be moved downwardly so as to lower the pick-up arm and cause the pick-up to engage with the outer portion of the playing groove of a record on the turntable. As the spindle 68 is moved downwards, the upper part 70*a* of the connecting member 70 is moved out of engagement with the sleeve 53*a* connected to the quadrant member 53. The upward pressure on the quadrant member 53 is thus relieved and the quadrant member is brought out of engagement with the driven member 82 so that the pick-up arm 12 is free to swing about its vertical axis to enable the playing of the record to take place.

Re-setting of the gate mechanism is effected at the end of each complete cycle of operations, that is, the stop member 39 is returned to its upper position relatively to the supporting post 29. For this purpose, a relatively stiff wire spring 90 serves as a bell crank lever with a horizontal pivot at 91 beneath the motor board, see Figure 4. One arm of the spring 90 engages in a hole in the stop member 39 and the other arm of the spring 90 engages in a slot 92 in a lever 93 pivoted at 94 beneath the motor board 10. A toggle link 95 is pivoted to the lever 93 which is urged by a spring, not shown, to project outwardly from the lever 93. The toggle link 95 has a pin 96 which is adapted to ride over the end surface of the lever 62 as the latter is rocked back and forth by the connecting bar 60. The said end of the lever 62 has a notch 97 which engages with the pin 96 as the lever 62 is being rocked in a clockwise direction as seen in Figure 4. When so engaged, the lever 93 will be rocked, due to the notch 97 serving as a pivot for the pin 96, as the lever 62 makes its clockwise movement, and the wire bell-crank lever 90 will be correspondingly rocked to raise the stop member to its upper position. As the stop member 39 is moved upwardly, it moves the bell-crank lever 34 in a counterclockwise direction as shown in Figures 8 to 10, so that the pin 48 is moved out of engagement with the cam surface of the trigger plate 27, so that the trigger plate 27 together with the arm 24 are free to rotate about their pivot 28. The trigger plate is thereupon rotated in a clockwise direction as seen in Figures 8 to 10 by a tension spring 42*a* (see Figure 3) which pulls the finger 42 downwardly. The finger 43 on the trigger plate 27 is thus brought back into engagement with the notch 44 in the bell-crank lever 34 so that the trigger plate 27 with its attached arm 24 is again held in its reset position with the arm 24 substantially horizontal. The slot 92 provides a lost motion connection with the wire bell-crank lever to enable the lever 93 to move during the return movement of the lever 62. During the said first movement, the lever 62 will have travelled clear of the pin 96, and so on its return movement the side edge of the lever 62 will strike the pin 96 and so rock the toggle link 95 without displacing the lever 93.

The record steadying member 21 serves another purpose as well as steading a stack of records which are supported on the step 20 of the spindle 19. The member 21 is mounted on the upper end of a spindle 100 which is rotatable and vertically slidable in a bearing 101 on the motor board, the lower end of the spindle being adapted to engage with a lever 102 pivoted at 103 on a bracket 104 on the underside of the motor board when the spindle is permitted to move downwardly. A spring not shown, is associated with the pivot 103 to urge the lever 102 upwardly and the lever 102 has a projection 105 for engagement with a plate 106 pivoted at 107 on a bracket 108 on the underside of the motor board. The plate 106 has a longitudinally disposed slot 109 along which the end portion of the lever 83 rides when moving about the pivot 63. The plate 106 is normally held in a raised position by the lever 102 so that the slot 109 is substantially horizontal. When the spindle is in its lower position depressing the lever 102, the plate 106 will also be lowered as shown in Figure 7 so that when the lever 83 reaches the right hand end of the slot 109 as seen in Figure 7, the lever 83 will enter a hook-like or latch recess 110 at the said end of the slot 109 so as to prevent any further movement in either direction of the lever 83. When the lever 83 is held in this position, it engages with a sliding plate 111 displacing the latter in the direction to rock a bar 112 about a pivot 113 to position the downturned end 114 of the bar 112 in the path of a pin 115 on the connecting bar 60 so that when the latter is moved downwardly as seen in Figure 4, the pin 15 will displace the bar 112 longitudinally so that a hook 116 on the bar 112 will engage with a lever 117 and rock the latter against the action of a spring 118 and a link 119 pivotally connected between the lever 117 and an electric switch 120 will actuate the latter to its off position so as to stop the motor 22. In this way, when the last record of a stack has been fed on to the turntable, the motor 22 will be stopped when the said record has been played and the pick-up arm has been raised and swung outwardly to its rest position clear of the turntable.

It will be understood that the several operations described will be effected in correct sequence and at the correct intervals together with mechanism for displacing the lowermost record from the step 20 of the magazine spindle 18, so as to effect the cycle of operations previously described.

We claim:

1. In an automatic phonograph, a turntable, means to support a plurality of disc records above said turntable, means to feed said records singly on to said turntable, a pick-up and means for locating said pick-up in dependence on the size of the record last fed on to said turntable, said locating means comprising a pivoted trigger including an arm projecting into the path of records of above a predetermined size as said records are fed on to said turntable, a movable stop member, means operatively connecting said stop member to said trigger, biasing means operative, in response to an initial displacement of said trigger arm by said record, to move said stop member from a first position into a further position, said biasing means also being operative to swing said trigger arm away from said record and out of the path of said record after said initial displacement, and a member movable with said pick-up engageable with said stop member in said first position to locate said pick-up in a first position corresponding to one size of record and engageable with said stop member in said further position to locate said pick-up in a further position corresponding to another size of record.

2. In an automatic phonograph, a turntable, means to support a plurality of disc records above said turntable, means to feed said records singly on to said turntable, a pick-up and means for locating said pick-up in dependence on the size of the record last fed on to said turntable, said locating means comprising a pivoted trigger including an arm projecting into the path of records of above a predetermined size as said records are fed on to said turntable, a lever engageable with said trigger in any one of at least two selective positions of engagement, a stop member connected to said lever, means biasing said lever for movement in one direction, said biasing means moving said lever after an initial displacement of said trigger by said record from a first position to a further position of engagement with said trigger, said lever moving said stop member from a first position into a further position and moving said trigger arm away from, and out of the path of, said record and a member movable with said pick-up engageable with said stop member in said first position to locate said pick-up in a first position corresponding to one size of record and engageable with said stop member in said further position to locate said pick-up in a further position corresponding to another size of record.

3. In an automatic phonograph, a turntable, means to support a plurality of disc records above said turntable, means to feed said records singly on to said turntable, a pick-up and means for locating said pick-up in dependence on the size of the record last fed on to said turntable, said locating means comprising a stop member, a member movable with said pick-up cooperating with said stop member, a two-armed lever, one arm of said lever being connected to said stop member, a spring operative to rock said lever in one direction, a pivoted trigger including an arm projecting into the path of records of above a predetermined size as said records are fed on to said turntable, a cam surface on said trigger, a follower on the second arm of said two armed lever for engagement with said cam surface to hold said two armed lever and said stop member against the action of said spring in one of at least two positions, whereby after an initial displacement of said trigger arm by said record said spring rocks said two armed lever from said one position to a further position, said two armed lever moves said stop member from a position for locating said member movable with said pick-up in a first position corresponding to one size of record to a position for locating said member in a further position corresponding to another size of record and said follower coacts with said cam surface to swing said trigger arm away from, and out of the path of, said record.

4. In an automatic phonograph, a turntable, means to support a plurality of disc records above said turntable, means to feed said records singly on to said turntable, a pick-up and means for locating said pick-up in dependence on the size of the record last fed on to said turntable, said locating means comprising a pivoted trigger including an arm projecting into the path of records of above a predetermined size as said records are fed on to said turntable, a cam surface and a projecting lug on said trigger, said cam surface having two depressions and a hump between said depressions, a pivoted bell-crank lever having a notch in one arm thereof, a cam follower fixed to said one arm, a stop member connected to the second arm of said bell-crank lever, a member selectively movable with said pick-up arm into one of three positions of engagement with said stop member and a spring operative to rock said bell-crank lever in one direction, said notch and said cam follower being selectively engageable with said projecting lug and either of said depressions respectively, whereby an initial displacement of said trigger arm by said record displaces said projecting lug from said notch and said spring rocks said bell-crank lever, bringing said cam follower into engagement with either one of said depressions in dependence upon the diameter of said record thereby swinging said trigger arm away from, and out of the path of said record, and moving said stop member from a position for locating said member movable with said pick-up in a first position corresponding to one size of record to either one of second or third positions for locating said member selectively in either one of second and third positions corresponding to second and third sizes of record.

References Cited in the file of this patent

UNITED STATES PATENTS 2,090,746 Compare ---------------- Aug. 24, 1937

FOREIGN PATENTS 693,594 Great Britain ------------ July 1, 1953